United States Patent [19]

Janssen et al.

[11] Patent Number: 5,025,404

[45] Date of Patent: Jun. 18, 1991

[54] METHOD OF CORRECTING ERRONEOUS VALUES OF SAMPLES OF AN EQUIDISTANTLY SAMPLED SIGNAL AND DEVICE FOR CARRYING OUT THE METHOD

[75] Inventors: Augustus J. E. M. Janssen; Raymond N. J. Veldhuis; Hendrik J. Prins; Lodewijk B. Vries, all of Eindhoven, Netherlands

[73] Assignee: U.S. Philips Corporation, New York, N.Y.

[21] Appl. No.: 442,495

[22] Filed: Nov. 27, 1989

Related U.S. Application Data

[63] Continuation of Ser. No. 317,115, Feb. 28, 1989, abandoned, which is a continuation of Ser. No. 180,665, Mar. 30, 1988, abandoned, which is a continuation of Ser. No. 20,140, Feb. 25, 1987, abandoned, which is a continuation of Ser. No. 601,817, Apr. 19, 1984, abandoned.

[30] Foreign Application Priority Data

Dec. 7, 1983 [NL] Netherlands .................. 8304214

[51] Int. Cl.⁵ .......................................... G06F 15/353
[52] U.S. Cl. .................................................... 364/723
[58] Field of Search ........................ 364/723; 371/31

[56] References Cited

U.S. PATENT DOCUMENTS

| | | | |
|---|---|---|---|
| 4,231,097 | 10/1980 | Shibayama et al. | 364/723 |
| 4,430,736 | 2/1984 | Scholz | 371/31 |
| 4,451,921 | 5/1984 | Odaka | 371/31 |
| 4,497,055 | 1/1985 | Hoshino et al. | 371/31 |

FOREIGN PATENT DOCUMENTS

0146988 3/1989 European Pat. Off. .

Primary Examiner—David H. Malzahn
Attorney, Agent, or Firm—Leroy Eason

[57] ABSTRACT

The values of incorrect samples of, for example, a digital audio signal are estimated by means of interpolation. For this purpose an appropriate sampling interval is determined from the number of incorrect samples, in which interval the incorrect samples are situated. Subsequently, a best-fitting recursion formula is determined from the values of the samples, a first estimate being taken for the values of the incorrect samples. By means of this recursion formula the value of a sample is expressed as a weighted sum of the values of a number of preceding samples and an error term. By means of the recursion formula thus found the values of the incorrect samples are subsequently estimated, in such a manner that they are best-fitting values for the recursion formula. The Application also discloses a device for carrying out the method.

33 Claims, 2 Drawing Sheets

METHOD OF CORRECTING ERRONEOUS VALUES OF SAMPLES OF AN EQUIDISTANTLY SAMPLED SIGNAL AND DEVICE FOR CARRYING OUT THE METHOD

This is a continuation of application Ser. No. 317,115, filed Feb. 28, 1989, now abandoned, which is a continuation of application Ser. No. 180,665 filed Mar. 30, 1988, now abandoned, which was a continuation of application Ser. No. 020,140 filed Feb. 25, 1987, now abandoned, which was a continuation of application Ser. No. 601,817 filed Apr. 19, 1984, now abandoned.

The invention relates to a method of correcting erroneous values of samples of an equidistantly sampled signal by interpolation. The invention also relates to a device for carrying out the method.

Such a method may be applied to pulse-code modulated systems as used for the transmission and processing of audio and speech signals. The method is particularly suitable for use in the "Compact Disc Digital Audio System" as described in Philips Technical Review, 40, 1982, No. 6, pages 151-180, 1981/1982. In this system samples of an analogue audio signal are recorded on a disc ("Compact Disc") in digitally coded form. Flaws or fingermarks etc. on the disc may give rise to errors in reading the digital information. In order to correct these errors the digital information is recorded on the disc in scrambled form and in addition error-correction codes are recorded on the disc. This enables some errors to be corrected completely. However, in the case of scratches etc. a multitude of consecutive errors, a so-called burst, may occur. If the number of errors is larger than can be corrected by means of the error correction code, these errors are merely detected. Due to these errors one or more samples with an incorrect value may be detected during read-out after the information has been descrambled. If one incorrect sample is detected its value is estimated by linear interpolation between the values of the preceding and the following sample. Alternatively, the value of the incorrect sample may be selected to be equal to that of the preceding sample. If two or more consecutive incorrect samples are detected, the values of these samples are made equal to zero ("muting"). In order to obtain a gradual transition the values of some of the preceding and following samples change gradually to zero.

European Patent Application 44963, published Feb. 3, 1982, discloses an interpolation method for correcting a maximum of four consecutive incorrect samples. In accordance with this method the value of each incorrect sample is estimated by taking a weighted mean of the value of the next correct sample and the value of the preceding correct sample or the preceding estimate, the weighting factors of the weighted mean being determined by the number of missing samples. In the case of more than four consecutive incorrect samples the value of the last correct sample is assigned to such a number of samples that four incorrect samples are left. The values of these four incorrect samples are then estimated by means of the said interpolation method.

SUMMARY OF THE INVENTION

Apart from the fact that this known interpolation method is comparatively inaccurate, it is not suitable for the correction of more than four consecutive incorrect samples. It is an object of the invention to provide an interpolation method which yields more accurate results for four or less errors and which moreover enables a larger number of errors to be corrected in an accurate manner. According to the invention a method is provided which from the number of incorrect samples a corresponding sampling interval is derived within which the incorrect samples are situated, a best-fitting recursion formula is determined from the values of the samples in said sampling interval, a first estimate being taken for the values of the incorrect samples, by means of which recursion formula the value of a sample is expressed as a weighted sum of the values of a number of preceding samples and an error term, and the values of the incorrect samples are estimated with said recursion formula. The invention is based on the recognition of the fact that for signals whose spectral characteristics do not vary too rapidly in time, such as audio and speech signals, the signal in a specific interval can be defined accurately by a best-fitting recursion formula with a finite number of terms. This recursion formula is determined by means of the values of the samples in said interval.

Subsequently, the values of the incorrect samples to be corrected are selected to be in conformity with the best-fitting recursion formula thus found. It is to be noted that describing values of samples by means of best-fitting recursion formulas is known per se from the article "Linear Prediction: A Tutorial Review" Proc. of the IEEE, Vol. 63, No. 4, April 1975; 561-580. However, in this article the recursion is not employed for computing the values of incorrect samples but for reducing the amount of data to be transmitted in transmission systems.

In accordance with the invention the following steps are carried out for determining the weighting factors of the terms of the recursion formula:

drawing up a recursion formula for a number of samples within the interval, which formula contains a weighted sum of the values of a number of preceding samples, the difference between the value of a sample and the value of the weighted sum being expressed as an error term, a first estimate being taken for the values of the incorrect samples and the number of samples for which the recursion formula is drawn up being substantially equal to the difference between the number of samples in the interval and the number of samples whose values are weighted in the weighted sum, determining the error energy corresponding to the error terms and averaged over the samples in the interval, minimizing the error energy as a function of each of the weighting factors.

The weighting factors are thus determined by determining the error term of the recursion formula for each sample for which a recursion formula can be drawn up. In these error terms the weighting factors are the only unknowns. The recursion formula is best fitting if the error energy averaged over the interval is minimal. The weighting factors are now found by minimizing the expression for the average error energy as a function of the weighting factors.

Minimizing the error energy requires the solution of a system of equations of the form:

$$R_1 a = b_1 \qquad (20)$$

where $$R_1 = r_{i,k} = \frac{1}{N-p} \sum_{j=p}^{N-1} S_{j-k} S_{j-i}$$

in which i, k = 1, ..., p
N = the number of samples in the interval
p = the number of samples in the recursion formula
$S_{j-k}$ = the value of the $(j-k)^{th}$ sample in the interval
$r_{i,k}$ = the (i, k) the estimated autocovariance coefficient
where
$a_1 = [a_1, \ldots, a_p]^T$ in which $a_1, \ldots, a_p$ are the weighting factors of the recursion formula, and
where
$b = [-r_{1,0}, \ldots, -r_{p,0}]^T$
in which $$r_{i,o} = \frac{1}{N-p} \sum_{j=p}^{N-1} S_j S_{j-i}$$

with i = 1, ..., p.

For the computation it is advantageous to replace said system by a Toeplitz system of the form:

$$R_2 a = b_2 \tag{21}$$

in which $R_1$ has been replaced by $R_2 = (r(i-k))_{i,k}$ where i, k = 1, ... p
in which
$r(i-k)$ is an estimator for the $(i-k)^{th}$ autocorrelation coefficient, and
where the vector $b_1$ has been replaced by the vector $$b_2 = -[r(1), r(2), \ldots, r(p)]$$

where
$r(i)$ is an $i^{th}$ estimator for the autocorrelation coefficient.

In order to obtain the Toeplitz-system an estimator must be taken for the autocorrelation coefficients. A selection from different estimators is possible. A suitable estimator which yields accurate interpolation results is given by:

$$r(j) = \frac{1}{N} \sum_{k=0}^{N-j-1} S_k S_{k+j} \tag{7}$$

where
j = (i−k) = 0, ... p
i, k = O, ... p.

For the computation of these estimators the values of every two samples must be multiplied by one another. In the Compact Disc Digital Audio System the values of the samples are defined by a 16-bit number, so that two. 16-bit numbers must be multiplied, which may required a considerable computation time. According to the invention this computation time may be reduced if for calculating the estimators of the autocorrelation coefficients the values of the samples are described with a lower degree of quantization than the actual degree of quantization of the samples. It has been found that this coarser degree of quantization has a small and generally negligible influence on the final results of the interpolation method. For the Compact Disc Digital Audio System it is found that samples represented by a 6-bit number still yield satisfactory results. In view of the required computation time it is also advantageous if instead of carrying out a multiplication the result of the multiplication is looked up in a table containing all the possible multiplication results. If the values of the samples are expressed as a 16-bit number a multiplication will yield a 32-bit number. The number of possible results of the multiplications is then $2^{32}$, so that a very large memory will be required for storing the table. Therefore, it is advantageous to describe the values of the samples with a lower degree of quantization, because this considerably reduces the number of possible results of the multiplication and consequently the required storage capacity.

A suitable method of solving the Toeplitz-system $R_2 a = b_2$ is by means of the Levinson-Durbin algorithm. This algorithm is described in the afore-mentioned article in I.E.E.E. Solving the system $R_2 a = b_2$ in fact means solving a system of p equations with p unknowns. Normally, this requires a number of operations of the order of $p^3$. However, solving the Levinson-Durbin algorithms only receives a number of operations of the order of $p^2$, which means a substantial reduction of the required computation time and storage capacity. This algorithm also has the advantage that in addition to the solution for the selected maximum number of terms in the recursion formula it yields the solutions with the corresponding average error energy for all recursion formulas with a number of terms smaller than the selected number as an intermediate result. The algorithm may be stopped if the error energy becomes smaller than a preset threshold. In this way it is possible to find the recursion formula with the smallest number of terms with which the samples in the interval can be described accurately.

In addition to a preselected value for the maximum number of terms of the recursion formula this maximum value may also be selected depending on the number of incorrect samples. For example, the maximum number p of samples in the recursion formula may be selected to increase as a linear function of the number m of incorrect samples. For example, for the Compact Disc Digital Audio signal, which has been sampled with a frequency of substantially 44.1 kHz, in accordance with a further embodiment, the maximum number p of samples in the recursion formula is given by the empirically found relationship p = 3m + 2. The number N of samples of the interval depends on the number m of incorrect samples and must be comparatively large relative to this number of incorrect samples for accurate computations of the weighting factors. For the Compact Disc Digital Audio signal in accordance with a further embodiment, the number N of samples is given by the empirically found relationship $N \approx 32m$. The maximum interval length is determined by the time over which the relevant signal may be regarded as stationary for interpolation purposes. For audio signals this time is at least approximately 0.01 s, which corresponds to approximately 500 samples for a Compact Disc Digital Audio signal. For these signals the method yields accurate results up to approximately 16 consecutive incorrect samples, the value of these incorrect samples being calculated by means of recursion formulas with a maximum number of approximately 50 terms. It is to be noted that the method is not limited to consecutive incorrect samples, so-called "bursts", but is also suitable for correcting non-consecutive incorrect samples.

After the weighting factors of the recursion formula have been computed by solving the system $R_2a=b_2$ in accordance with the above method, the following steps may be carried out for estimating the values of the incorrect samples:

within the first interval in which the incorrect samples are situated a second interval is determined whose first sample is situated at least a number of samples equal to the number of samples in the recursion formula before the first incorrect sample and whose last sample is situated at least a number of samples equal to the number of samples in the recursion formal after the last incorrect sample, for at least the samples from the first incorrect sample up to and including the last sample in the second interval the recursion formula is drawn up with the computed weighting factors, the error energy averaged over the relevant samples in the interval and corresponding to the error terms of the recursion formula is determined, and the estimates of the incorrect samples are determined by minimizing the error energy as a function of the values of the incorrect samples.

Thus, the recursion formula establishes a relationship between the value of each sample in the second interval, reckoned from the first incorrect sample, and the values of a specific number of preceding correct or incorrect samples. The values of the incorrect samples must now be selected so as to minimize the mean square error of the recursion formulas. This is achieved for those values of the incorrect samples for which the average error energy corresponding to the error terms is minimal as a function of these values. The recursion formulas drawn up for the samples may be written as a system of equations of the form:

$$MS = e \qquad (10)$$

where $$M = (m_{ij}) \quad \begin{array}{l} i = 0, \ldots N' - p - 1 \\ j = 0, \ldots N' - 1 \end{array} = (a_{p-i+j}) \quad \begin{array}{l} i = 0, \ldots N' - p - 1 \\ j = 0, \ldots N' - 1 \end{array}$$

where
$N'=$ the number of samples in the second interval,
$a_i=0$, for $i<0$ and $i>p$, and
$a_0, a_1, \ldots, a_p =$ the weighting factors of the recursion formula
where
$S=(S_0, \ldots, S_{N'-1})^T$ with $S_0, \ldots, S_{N'-1}$ being the values of the samples in the second interval, and
where
$e=(e_p, e_{p+1}, \ldots, e_{N'-1})^T$ with $e_p, \ldots, e_{N'-1}$ being the values of the error terms of the recursion formulas for the samples $S_p, \ldots S_{N'-1}$.

Computation is simplified if this system is converted into a system of the form:

$$Q = \frac{1}{N-p} \sum_{j=p}^{N-1} |e_j|^2 \qquad (2)$$

This enables the error energy to be expressed as an equation of the form:

$$e^T e = (y^T B^T + x^T A^T)(Ax + By) \qquad (13)$$

for which, as is known, the vector $x_{min}$ which minimizes this equation satisfies:

$$(A^T A) x_{min} = -A^T B y \qquad (14)$$

The values of the samples to be corrected are thus estimated by calculating the vector $x_{min}$. It can be demonstrated that the vector $x_{min}$ is found by solving the system:

$$V x_{min} = w \qquad (15)$$

where
$V = A^T A$ with $(A^T A)_{i,j} = \lambda_{ti-tj}$ in which $i, j = 1, \ldots, m$
where
$w = (A^T B)y$ with $$(A^T B y)_i = \sum_{k=0}^{N-1} \lambda_{ti-k} S_k$$

in which $i = 1, \ldots, m$ $k \neq t_1, \ldots, t_m$ with $(A^T B)_{i,k} = \lambda_{ti-k}$ in which $$\begin{cases} i = 1, \ldots, m \\ k \neq t_1, \ldots t_m \end{cases}$$

and where $$\lambda_k = \sum_{l=0}^{p} a_l a_{l+k}$$

with $$\begin{cases} k = -p, \ldots, 0, \ldots p \\ a_l = 0, \text{ for } l > p \text{ and } l < 0 \end{cases}$$

In the event of a so-called burst, for which $S_{t1}, \ldots S_{tm}$ are consecutive samples, the system $V x_{min} = w$ is a Toeplitz system which in accordance with the invention can be solved in an advantageous manner by the Levinson algorithm, which is described in the article "The Wiener RMS error criterion in filter design and prediction", J. Math. Phys., Vol. 25, No. 4, pages 261-278, 1947. Calculating the factor $x_{min}$ yields estimates for the values of the incorrect samples $S_{t1}, \ldots; S_{tm}$ to be corrected, which in principle solves the interpolation problem.

The method in accordance with the invention may be further characterized in that the method is repeated at least one time, the weighting factors of the best-fitting recursion formula being computed from the values of the correct samples in the interval and the values of the incorrect samples computed by means of the method. This results in even more accurate values for the incorrect samples. Another advantage of this iterative method is that it enables a substantially larger number of incorrect samples within the same interval and also a larger number of incorrect samples in a larger interval to be corrected than if the method is not updated. For the Compact Disc Digital Audio System this enables a number of approximately 50 to 100 incorrect samples to be corrected within an interval of approximately 512 to 1024 samples, the recursion length being approximately 50 to 100.

A device for carrying out the method is characterized in that the device comprises:
input means for entering the values of samples of the sampled signal,
detection means for detecting incorrect samples,
first computing means for estimating the best-fitting recursion formula,
second computing means for estimating the values of the incorrect samples, and
output means for feeding out the values of samples of the sampled signal.

Another embodiment is characterized in that the first computing means comprise:
means for computing the number of samples in the interval,
means for computing the maximum number of samples in the weighted sum of the recursion formula.

If the signal is a Compact Disc Audio signal the number of samples in the interval can be calculated for example by means of the formula $N=32m$ and the maximum number of samples in the weighted sum can be calculated for example by means of the formula $p=3m+2$. After the interval and the recursion length have been determined the weighting factors of the recursion formula may be calculated by the further first computing means. In a further embodiment these means may be provided with:
means for computing the estimators for the autocorrelation coefficients:

$$r(j) = \frac{1}{N} \sum_{k=0}^{N-j-1} S_k S_{k+j} \quad (7)$$

where
$j=(i-k)=0, \ldots p$
$i, k=0, \ldots p$
and
means for solving the system:

$$Ra=b \quad (16)$$

where
$r_{i,k}=r(j)$ with $j=(i-k)=0, \ldots, p-1; i, k=1, \ldots, p$
$b=-[r(1), r(2), \ldots, r(p)]^T$
$a=[a_1, \ldots, a_p]^T$ where $a_i$ are the weighting factors.

The computing time and storage capacity required for computing the estimators for the autocorrelation coefficients can be reduced substantially if, in a further embodiment, said computing means comprise means for reducing the degree of quantization of the samples. This reduction may be achieved for example by shifting the bits representing the values of the samples by a plurality of bit positions towards the least significant bit. In a further embodiment the computing time can also be reduced in that not every multiplication is carried out but that the means for computing the autocorrelations coefficients comprise means for determining the product of the values of two samples by means of a table of possible values of this product. The means for solving the system $Ra=b$ preferably comprise the Levinson-Durbin algorithm. A version of the second computing means is characterized in that the second computing means comprise
means for computing the numbers:

$$\lambda_k = \sum_{l=0}^{p} a_l a_{l+k} \quad (17)$$

where
$k=-p, \ldots, 0, \ldots p$ and
$a_l=0$ for $l>p$ and $l<0$,
and means for computing the numbers:

$$w_i = (A^T B y) = \sum_{k=0}^{N-1} \lambda_{t_i-k} S_k \quad (18)$$

where
$i=1, \ldots, m$
$k \neq t_1, \ldots t_m$.

In a further version the second means comprise further means for solving the system:

$$V x_{min} = w \quad (19)$$

where
$V = A^T A$ with $(A^T A)_{i,j} = \lambda_{t_i - t_j}$
in which
$i, j = 1, \ldots, m$
$x_{min} = [S_{t_1}, \ldots, S_{t_m}]^T$
where $S_{t_1}, \ldots S_{t_m}$ are the values of the missing samples.

If $S_{t_1}, \ldots S_{t_m}$ are consecutive samples, the system $v x_{min}=w$ is a Toeplitz system, which in a further embodiment is preferably solved by means comprising the Levinson algorithm.

The invention will now be described in more detail, by way of example, with reference to the accompanying drawings.

DESCRIPTION OF THE PREFERRED EMBODIMENTS

Figure 1:
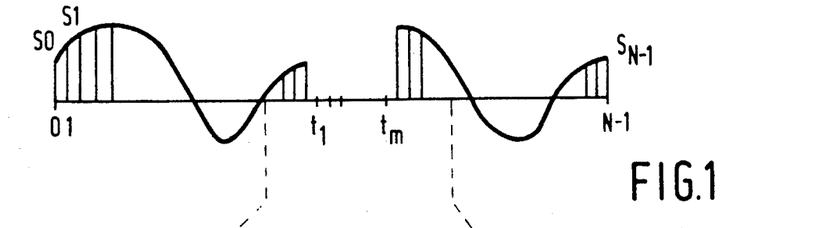
FIG. 1 represents an interval of a sampled signal to explain the method in accordance with the invention.

The method in accordance with the invention will be explained with reference to FIG. 1, which shows an interval of an analogue signal which has been sampled at the instants $0, 1, \ldots, N-1$ with associated sampling values $S_0, S_1, \ldots S_{N-1}$. In this interval the samples detected by the detection means at the instants $0 < t_1 < t_2 \ldots < t_m < N-1$ have incorrect values. For these samples estimated values which as accurately as possible approximate the actual values have to be found. The method employed for this purpose is based on the recognition of the fact that for signals with comparatively slow spectral variations, such as audio and speech signals, the value of a sample in the interval may be defined by means of a best-fitting finite recursion, i.e. as a weighted sum of the values of a number of preceding samples, the mean square of the difference between the value of the sample and the weighted sum being small on the average. In this respect small is to be understood to mean that the energy corresponding to these differences and averaged over the interval is small in comparison with the signal energy averaged over the interval. For the interval $0, \ldots, N-1$ a recursion formula may be drawn up for the samples for which $p \leq j \leq N-1$, where $p \geq 1$, which formula has the form:

$$e_j = a_0 S_j + a_1 S_{j-1} + \ldots + a_p S_{j-p} \qquad (1)$$

where:

$a_0, a_1, \ldots a_p$, in which $a_0 = 1$, are the recursion coefficients.

$S_j, \ldots, S_{j-p}$ are the values of the samples at the instants $j, \ldots, j-p$, and $e_j$ is the error term.

For estimating the recursion coefficients $a_1, \ldots, a_p$ the maximum order p of the recursion formula must be known. This maximum order p may be selected depending on the number of incorrect samples. For an audio signal which originates from a Compact Disc and which comprises $44.1 \times 10^3$ samples per second, it has been found empirically that for interpolation purposes the values of the samples can be described satisfactorily by means of a recursion formula whose maximum order p is given by $p = 3m + 2$, where m is the number of incorrect samples. Later in the description it will be explained why the "maximum" order p is discussed. The recursion coefficients are determined by taking a first estimate for the values of the incorrect samples in the interval, for example by assuming that these values are zero and by drawing up to a recursion formula of the order p in accordance with formula 1 for the samples for which this is possible. Subsequently, the error energy averaged over the interval and corresponding to the error terms $e_j$ is computed. This averaged error energy Q is given by:

$$Q = \frac{1}{N-p} \sum_{j=p}^{N-1} |e_j|^2 \qquad (2)$$

where $e_j$ is given by formula (1). In order to allow the assumption that the incorrect samples are zero, the number of correct samples in the interval must be comparatively large with respect to the number of incorrect samples. For the Compact Disc digital audio signal it has been found empirically that an interval with a number N of sample given by $N = 32m$ is adequate. The recursion formula is best-fitting if the error energy Q is minimal. The recursion coefficients must then comply with $$\frac{\partial Q}{\partial a_i} = 0$$

where $i = 1, \ldots, p$. Using formulas 1 and 2, this results in a system of equations given by:

$$\sum_{k=0}^{p} a_k \left( \frac{1}{N-p} \sum_{j=p}^{N-1} S_{j-k} S_{j-i} \right) \qquad (3)$$

With the numbers $r_{i,k}$, which are defined as $$r_{i,k} = \frac{1}{N-p} \sum_{j=p}^{N-1} S_{j-k} S_{j-i}, \qquad (4)$$

$i, k = 0, 1, \ldots p$, the system of equation (3) may be reduced to a system of the matrix form:

$$Ra = b \qquad (5)$$
where $R = (r_{i,k})$, $i, k = 1, \ldots, p$
$a = [a_1, \ldots, a_p]^T$
$b = [-r_{1,0}, \ldots, -r_{p,0}]^T$ A further examination of equation 4 shows that the elements $r_{i+1, k+1}$ may be written as:

$$r_{i+1, k+1} = r_{i,k} + \frac{1}{N-p} \times (S_{p-k-1} S_{p-i-1} - S_{N-k-1} S_{N-i-1}). \qquad (6)$$

Since the number of samples N in the interval is large the second term is negligible, so that $r_{i+1, k+1} \approx r_{i,k}$. Moreover, the $r_{i,k}$'s of equation 4 are found to be estimators for autocovariance coefficients, which may be replaced by simpler to compute estimators for the autocorrelation coefficients. An estimator for the autocorrelation coefficients yielding satisfactory interpolation results is given by:

$$r(j) = \frac{1}{N} \sum_{k=0}^{N-j-1} S_k S_{k+j} \qquad (7)$$

where
$j = (i - k) = 0, \ldots p$
$i, k = 0, \ldots p$.

It is to be noted that alternatively other estimators may be used for the autocorrelation coefficients. Moreover, the estimators for the autocorrelation coefficients may be computed in a manner other than that described, for example by means of Fourier transforms. By means of equations 6 and 7 the system of equation 5 may be reduced to a so-called Toeplitz system, which is given by:

$$\begin{bmatrix} r(0) r(1) \ldots r(p-1) \\ r(1) \\ \cdot \\ \cdot \\ \cdot \\ r(p-1) r(p-2) r(0) \end{bmatrix} \begin{bmatrix} a_1 \\ \cdot \\ \cdot \\ \cdot \\ a_p \end{bmatrix} = - \begin{bmatrix} r(1) \\ \cdot \\ \cdot \\ \cdot \\ r(p) \end{bmatrix} \qquad (8)$$

Here, the matrix R is a symmetric Toeplitz matrix whose elements on each diagonal are identical. The system of p equations with p unknowns, as given by equation 8, can be solved in an advantageous manner by means of the so-called Levinson-Durbin algorithm, described in the afore-mentioned article in Proc. of the IEEE, Vol. 63, No. 4, April 1975, 561–580. This algorithm has the advantage that the system of equation 8 is solved by means of approximately $p^2$ operations, whilst generally this demands $\frac{1}{3} p^3$ operations. In addition to the solution for the maximum value of the order p, the algorithm also yields all solutions for 1 to p with the corresponding average error energy as intermediate results. The maximum order p which follows from the empirically found formula $p = 3m + 2$ is generally needed in order to obtain sufficiently accurate interpolation results, i.e. in order to obtain a sufficiently low average error energy. For very simple audio signals, such as a simple sinewave signal, this sufficiently low average error energy may already be obtained for an order smaller than the maximum order p that follows from the empirical formula. The algorithm then stops if this predetermined threshold for the average error energy is reached. A further advantage of this algorithm is that this algorithm may be employed in order to find the order p of the recursion of the maximum value of the order p is not given by an empirically found formula. If a specific value is selected for the order p this algorithm, as already stated, yields the solutions for 1 to p inclusive an increasing order with the corresponding average error energy Q as an intermediate results. The algorithm may now be stopped if the error energy decreases below a predetermined threshold, the corresponding p then being the recursion order.

Figure 2:
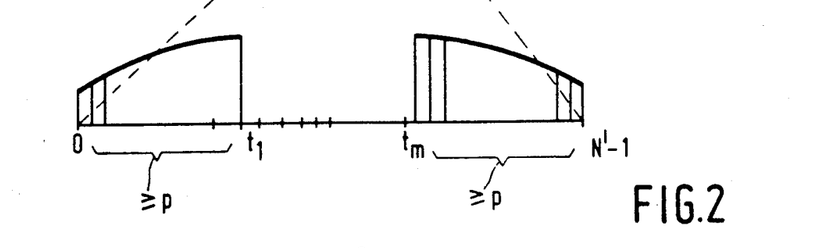
FIG. 2 shows a sub-interval of the interval in FIG. 1.

Solving the system of equation 8 yields the coefficients $a_1, \ldots, a_p$ ($a_0 = 1$) for which $a_0 S_j + a_1 S_{j-1} + \ldots + a_p S_{j-p}$ is minimal in comparison with the average signal energy. The values of the incorrect samples are now computed by means of this equation. For this purpose a second interval $0, \ldots, N'-1$ within the interval $0, \ldots, N-1$ is considered, the first sample of this second interval being situated at least p samples before the first incorrect sample $t_1$ and the last sample being situated at least p samples after the last incorrect sample $t_m$ (see FIG. 2). For each sample in the interval $0, \ldots, N'-1$ for which $p \leq j \leq N'-1$ a recursion formula with the recursion coefficients $a_0, a_1, a_p$ which are now known is drawn up:

$$e_j = a_0 S_j + a_1 S_{j-1} + \ldots + a_p S_{j-p} \quad (9).$$

The recursion equations for all samples in the interval may be written as follows in matrix form:

$$MS = e \quad (10)$$

where $$M = (m_{ij}) \quad \begin{matrix} 1 = 0, \ldots N'-p-1 \\ j = 0, \ldots N'-1 \end{matrix} = (a_{p-i+j}) \quad \begin{matrix} i = 0, \ldots N'-p-1 \\ j = 0, \ldots N'-1 \end{matrix}$$

where
$N'$ = the number of samples in the second interval,
$a_i = 0$, for $i < 0$ and $i > p$, and
$a_0 = 1, a_1, \ldots, a_p$ = the weighting factors of the recursion formula
where
$S = (S_0, \ldots, S_{N'-1})^T$ with $S_0, \ldots, S_{N'-1}$ being the values of the samples in the second interval, and
where
$e = (e_p, e_{p+1}, \ldots, e_{N'-1})^T$ with $e_p, \ldots, e_{N'-1}$ being the values of the error terms of the recursion formulas for the samples $S_p, \ldots S_{N'-1}$.

The values for the incorrect samples $S_{t_1}, S_{t_2}, \ldots S_{t_m}$ are noted as a vector $x = (x_1, \ldots x_m)^T$. For the vector x that vector is selected for which the error energy Q is averaged over the interval and given by:

$$Q = \frac{1}{N-p} \sum_{j=p}^{N-1} |e_j|^2 \quad (11)$$

is minimal. The corresponding values $x_1, \ldots, x_m$ are then the estimates for the incorrect samples. By appropriate partitioning of M and s the system of equation (10) may be written as:

$$Ax + By = e \quad (12)$$

where
$A = (a_p + t_j - i) \quad i = 0, \ldots, N'-p-1$
$j = 1, \ldots, m$
$x = (S_{t_1}, \ldots S_{t_m})^T$ where $S_{t_1}, \ldots, S_{t_m}$ are the values of the incorrect samples at positions $t_1, \ldots t_m$ in the second interval $$Ax + By = e \quad (12)$$

where $$A = (a_p + t_j - i) \quad \begin{matrix} i = 0, \ldots, N'-p-1 \\ j = 1, \ldots, m \end{matrix}$$
$x = (S_{t_1}, \ldots S_{t_m})^T$ where $S_{t_1}, \ldots, S_{t_m}$ are the values of the incorrect samples at positions $t_1, \ldots t_m$ in the second interval $$B = (a_{p+j-i}) \quad \begin{matrix} i = 0, \ldots, N'-p-1 \\ j = 1, \ldots, N'-1; j \neq t_1, \ldots t_m \end{matrix}$$

and where
$y = [S_k]^T \, k = 0, \ldots N'-1; k \neq t_1, \ldots, t_m$ and where
$y = [S_k]^T \, k = 0, \ldots N'-1; k \neq t_1, \ldots, t_m.$ In the above equation x is the m-vector of unknown sample values, y the $(N'-m)$ vector of known sample values, A the $(N'-p) \times m$ matrix of which the $j^{th}$ column is identical to the $t_j^{th}$ column of M, and B the $(N'-p) \times (N'-m)$ matrix, which comprises the other columns of M. By means of equation (12) equation (11), which gives the average error energy, may be reduced to:

$$e^T e = (y^T B^T + x^T A^T)(Ax + By) \quad (13)$$

It can be demonstrated that the vector x for which $e^T e$ is minimal, complies with:

$$(A^T A) x_{min} = -A^T By \quad (14)$$

Therefore, the computation of the missing samples is in a fact a computation of the vector $x_{min}$. By elaborating the matrices $A^T A$ and $A^T B$ and by rearranging equation 14, the computation of $x_{min}$ in effect requires the solution of the system:

$$V x_{min} = w \quad (15)$$

where
$V = A^T A$ with $(A^T A)_{i,j} = \lambda_{ti - tj}$ in which $i, j = 1, \ldots, m$
where
$w = (A^T B) y$ with $$(A^T By)_i = \sum_{k=0}^{N'-1} \lambda_{ti-k} S_k$$

in which
$i = 1, \ldots, m$
$k \neq t_1, \ldots, t_m$
with
$(A^T B)_{i, k} = \lambda_{ti-k}$ in which $$\begin{cases} i = 1, \ldots, m \\ k \neq t_1, \ldots t_m \end{cases}$$

and where $$\lambda_k = \sum_{l=0}^{p} a_l a_{l+k}$$

with $$\begin{cases} k = -p, \ldots, 0, \ldots p \\ a_l = 0, \text{ for } l > p \text{ and } l < 0 \end{cases}$$

In the present example the incorrect samples form a so-called burst, i.e. the incorrect samples form a sequence of consecutive samples. In the present case the symmetric matrix $A^T A$ is a Toeplitz matrix, so that the system of equation 15 is a Toeplitz system, which can be solved advantageously by means of the Levinson algorithm. It is to be noted that the method is not limited to so-called bursts, but that the values of a plurality of non-consecutive incorrect samples can also be corrected by means of the method. The system of equation (15) may then be solved for example by means of an LU-decomposition.

When the above method is applied to signals of the Compact Disc Digital Audio System it is found possible to compute burst errors in an accurate manner up to approximately 16 incorrect samples. In the case of 16 incorrect samples an interval of approximately 512 samples is required for determining the recursion coefficients, which corresponds to a period of approximately 0.01 s. Within this period audio signals may be regarded as stationary for interpolation purposes.

In a second version of a method in accordance with the invention the value of the samples are computed in an iterative fashion. Firstly, the samples are computed in the above manner, assuming that the values of the incorrect samples are zero for computing the estimators for the autocorrelation coefficients in accordance with equation 7. Subsequently, the values of the incorrect samples are recalculated, the calculated values now being assigned to the incorrect samples in order to computate the autocorrelation coefficients. This step may be repeated several times. This may lead to a higher accuracy of the computer values of the incorrect samples. By means of this iterative method it is alternatively possible to select a smaller interval in order to compute an equal number of incorrect samples. Thus, for a burst error of 16 samples an interval of 100 instead of 512 samples is adequate, the same accuracy of the computed values of the incorrect samples being attained after, for example, 2 or 3 iteration steps. Moreover, this iterative method enables a larger number of incorrect samples to be corrected within comparable intervals than in the case that the method is not repeated. In an interval of approximately 1024 samples this enables approximately 100 incorrect samples to be corrected.

Figure 3:
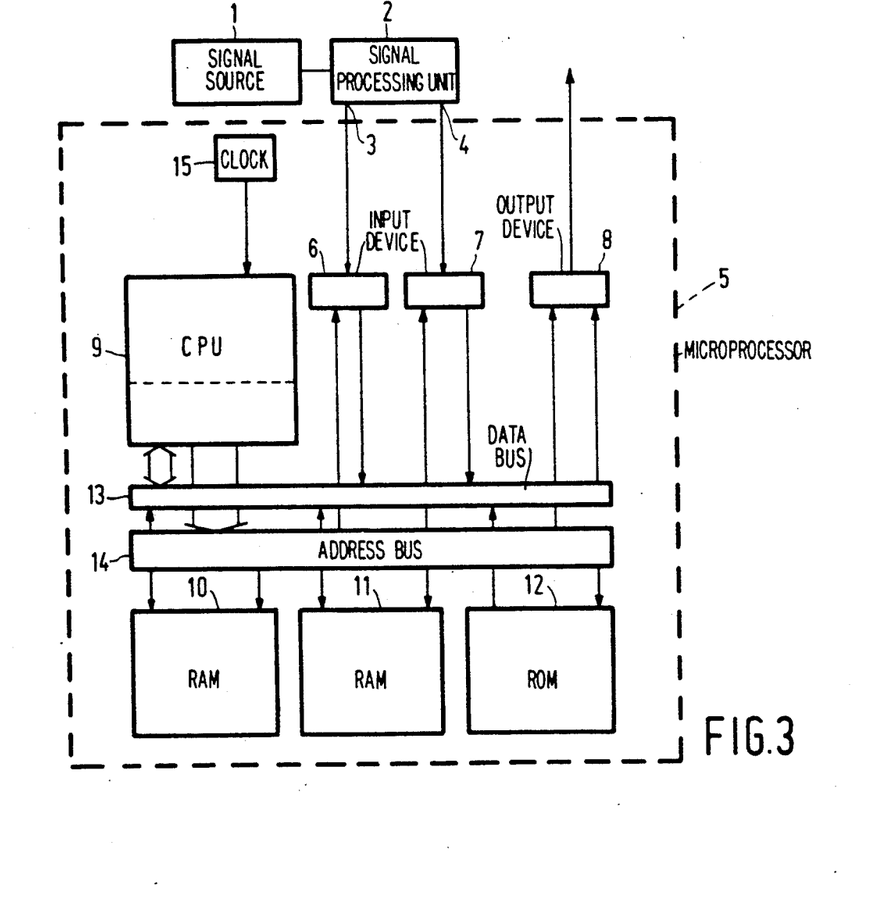
FIG. 3 shows an apparatus for carrying out the method in accordance with the invention.
Figure 4:
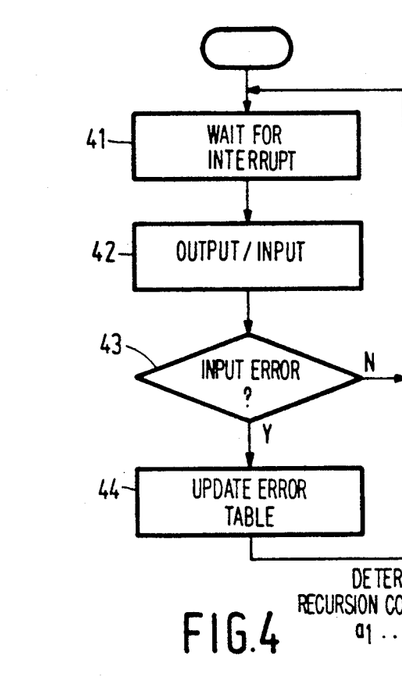
FIG. 4 is a flow chart of the input/output program.
Figure 5:
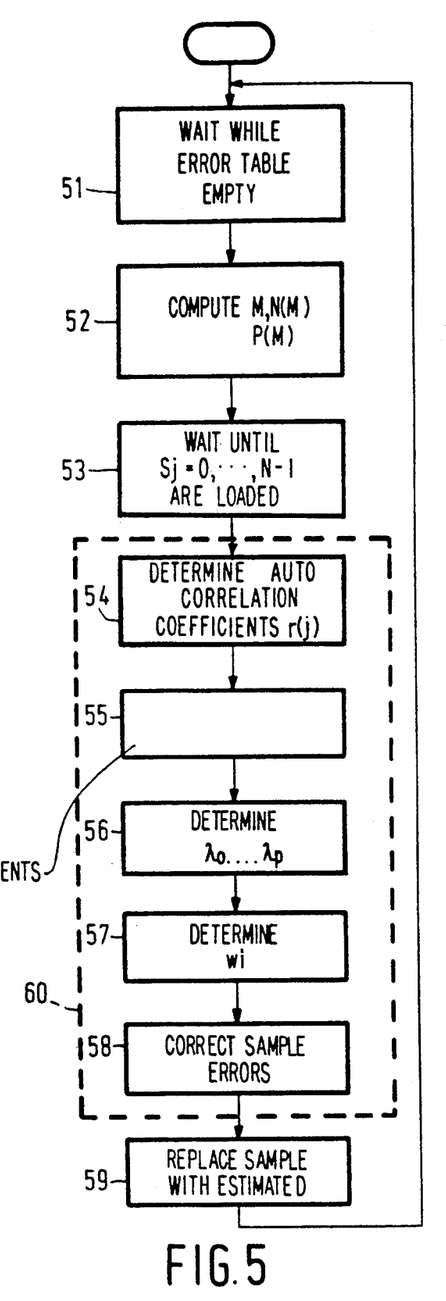
FIG. 5 is a flow chart of the interpolation program.

FIG. 3 is the block diagram of a device in accordance with the invention. The block 1 is a compact-disc player as described comprehensively in Philips Techn. Review 40, No. 9, 1981/1982. In this respect it is to be noted that the digital audio signal to which error-correction codes have been added and which has been time-interleaved in accordance with a specific code, is recorded on a disc along a spiral track of pits and intermediate areas. The digital information is read by means of a laser and is subsequently applied to a signal processing unit 2, in which this digital signal is demodulated and, if necessary, corrected. On output 3 the values of the samples appear in the form of 16-bit numbers. If more errors occur than can be corrected by means of the error-correction codes, these errors are merely detected. If a sample with an incorrect value appears on output 3 an error-flag will appear on output 4 of the processing unit, which flag is formed by a 1-bit signal. The values of the samples and the error-flags are applied to the respective input devices 6 and 7 of a microprocessor arrangement 5 by means of which the incorrect values are corrected. In addition to an output device 8 for the feeding out the sample values this processor 5 comprises a central processing unit 9 with a control unit and an arithmetic and logic unit. Moreover, the processor 5 comprises three memories 10, 11 and 12. The memories 10 and 11 are RAMs, the memory 10 serving as a cyclic buffer and memory 11 as a working store for the storage of intermediate results. The memory 12 is a ROM in which the program for correcting the incorrect values of the samples are stored. The memories 10, 11 and 12 are coupled to the central processing unit 9 by a data bus 13, via which bus the data can be transferred. For the transfer of addresses the memories 10, 11 and 12 and the input and output devices 6, 7 and 8 are coupled to the central processing unit 9 via an address bus 14. Moreover, the processor 5 is provided with a clock 15 by means of which the operation of the central processing unit is interrupted to allow the input and output of data. For digital audio a constant transfer of samples is required in order to ensure that the samples appear on the output with the same frequency as that with which the signal has been sampled. The input and output of data is controlled by a program stored in the program store 12. FIG. 4 is a flow chart of this program. The program may be described as follows: for the inscriptions, see Table 1.

block 41, inscription: "wait for interrupt", description: data input and output is possible during an interrupt, i.e. when a clock pulse from the data clock 15 appears.

block 42, inscription: "output/input", description: when a clock pulse appears the value of a new sample is entered via input 7 and is written into the first free address in the memory 10, the oldest sample in the memory 10 being read out and fed out.

block 43, inscription: "input error?", description: when a new sample is read in the error flag is read in via input 6. If no incorrect value is detected the next clock pulse is awaited to repeat the procedure.

block 44, inscription: "update error table", description: if a sample with an incorrect value is detected the address of this sample in the memory 10 is written into a table of incorrect samples in the working store 11. In the above manner the cyclic buffer memory 10 functions as a delay line whose delay depends on the time required for one interpolation, measured from the entry of the first incorrect sample up to and including the correction of the last incorrect sample. The program stored in the memory 12, by means of which programme the values of the incorrect samples are calculated by interpolation, is started if the input/output program detects an incorrect sample. This interpolation program is explained with reference to FIG. 5, which is a flow chart of the program (for inscriptions: see Table 2).

block 51, inscription: "wait while error table empty", description: as long as no error is detected the interpolation program is inoperative.

block 52, inscription: "compute m, N(m), p(m)", description: when an incorrect sample is detected the number N of samples in the interval and the maximum number p of samples in the weighted sum of the recursion formula are computed with respective formulas $N=32m$ and $p=3m+2$, where m is the number of incorrect samples. For $m=1$ this yields $N=32$ and $p=5$. This means, that prior to and subsequently to the incorrect sample at position $t_1$ each time 16 correct samples must be present. The 16 preceding samples are correct because it concerns the first incorrect sample that has been detected. If the 16 next samples are correct, the program is continued. If within these 16 samples at position $t_2$ a second incorrect sample is detected, $N=64$ and $p=8$ if $m=2$, so that 32 correct samples must appear before and after the sample $t_2$. This may continue until a specific maximum interval length is reached. This maximum is attained for example in the case of 16 consecutive errors for $N=512$, which corresponds to the period over which audio signals may be regarded as stationary.

block 53, inscription: "wait until $(S_j)$ $j=0,\ldots,N-1$ are in buffer". Description: If m, N and p are known, the values of the N samples of the interval are stored in a part of the memory 11, the values of the incorrect samples being assumed to be equal to zero.

block 54, inscription: "computer(j), $j=0,\ldots,p$". With the values of the samples in this interval the autocorrelation coefficients r(j) are calculated, which are given by formula (7). The computation of the products $S_k S_{k+j}$ can be effected in a rapid manner by reducing the degree of quantization of the samples. This may be achieved for example by shifting the 16-bit numbers representing the sample values by a plurality of bits towards the least significant bit. It has been found that this lower degree of quantization has a minor influence on the ultimately computed values of the incorrect samples. Thus, satisfactory results can be achieved for samples whose values are expressed by a 6-bit number. The products $S_k \cdot S_{k+j}$ can also be obtained rapidly by not repeating each calculation but by looking up the results in a table in the working store 11, which table contains all possible results of the product $S_k S_{k+j}$.

block 55, inscription: "compute $a_1,\ldots a_p$". Description: by means of the calculated autocorrelation coefficients the recursion coefficients $a_1 \ldots a_p$ are computed by solving the following system by means of the Levinson-Durbin algorithm:

$$Ra=b \qquad (16)$$

where
$r_{i,k}=r(j)$ with $j=(i-k)=0,\ldots,p-1$;
$i, k=1,\ldots,p$
$b=-[r(1), r(2),\ldots,r(p)]^T$
$a=[a_1,\ldots,a_p]^T$ where $a_i$ are the weighting factors.

block 56, inscription: "compute $\lambda_0,\ldots,\lambda_p$", description: by means of the recursion coefficients now known the factors $\lambda_k$ are calculated, these factors being given by:

$$\lambda_k = \sum_{l=0}^{p} a_l a_{l+k} \qquad (17)$$

where
$k=-p,\ldots,0,\ldots p$ and
$a_1=0$ for $l>p$ and $l<0$.

block 57, inscription: "compute syndrome". Subsequently, the components $w_i$ of the vector w are calculated, which components are given by:

$$w_i = (A^T B y) = \sum_{k=0}^{N'-1} \lambda_{t_i-k} S_k \qquad (18)$$

where
$i=1,\ldots,m$
$k \neq t_1,\ldots t_m$.

Summation is applied over an interval $0,\ldots,N'-1$, of which the first sample $S_0$ is situated p samples before the first incorrect sample $S_{t_1}$ and the last sample $S_{N'-1}$ is situated p samples after the last incorrect sample $S_{t_m}$.

block 58, inscription: "solve missing samples". Description: the values of the incorrect samples $S_{t_1},\ldots S_{t_m}$ are computed by solving the system:

$$V x_{min} = w \qquad (19)$$

where
$V=A^T A$ with $(A^T A)_{i,j}=\lambda t_i - t_j$
in which
$i, j=1,\ldots,m$
$x_{min}=[S_{t_1},\ldots,S_{t_m}]^T$
where $S_{t_1},\ldots S_{t_m}$ are the values of the missing samples. The system $V x_{min}=w$ is solved with a program for solving a system of m equations with m unknowns. If $S_{t_1},\ldots S_{t_m}$ are consecutive samples, this system is a Toeplitz system, which can be solved by means of the Levinson algorithm.

block 59, the values of the incorrect samples which were set to zero in the memory 10 are now replaced by the estimates $S_{t_1},\ldots S_{t_m}$. After this the program is repeated.

The invention is not limited to the example described in the foregoing. For example, the calculated values $S_{t_1},\ldots S_{t_m}$ may be employed for recomputing the autocorrelation coefficients r(j), the recomputed values now being adopted for the values of the incorrect samples. Subsequently, the part 60 of the program indicated by a broken line in FIG. 5 is repeated. It may be repeated several times. In this way a higher accuracy of the calculated values can be achieved. Moreover, if this iterative method is applied, the number N of samples may be reduced in order to compute the same number of incorrect samples with the same accuracy. Also this iterative method enables a larger number of incorrect samples to be corrected within the same interval and even within smaller intervals. It will be evident that within the scope of the present invention several devices are possible by means of which the values of incorrect samples can be corrected with the specified interpolation method based on best-fitting finite recursions. The invention is not limited to the correction of incorrect samples of digital audio or speech signals, but may also be used for example for suppressing scratches on grammophone records, in which case the analog signal obtained from the record must be sampled first.

What is claimed is:

1. A method of correcting erroneous values of samples of a uniformly sampled signal by interpolation, comprising:
   determining from a plurality of samples the number of samples having erroneous values;
   deriving from the number of samples having erroneous values a corresponding sampling interval within which the samples having erroneous values are situated;
   determining the coefficients of a recursion formula from the values of samples in said sampling interval, a first estimate being taken for the values of the samples having erroneous values, said recursion formula expressing the value of a sample as a weighted sum of the values of a number of preceding samples, with the sample coefficients being weighing factors, and an error term, and
   estimating the correct values of the samples having erroneous values with said recursion formula.

2. A method as claimed in claim 1, wherein weighting factors of a weighted sum of the recursion formula are determined by the following steps:
   determining a recursion formula for a number of samples within the interval, which formula contains the weighted sum of the values of a number of preceding samples, the difference between the value of a sample and the value of the weighted sum being expressed as an error term, a first estimate being assumed for the samples having erroneous values, and the number of samples for which a recursion formula is determined and therefore the number of error terms being substantially equal to the difference between the number of samples in the interval and the number of samples whose values are weighted in the weighted sum;
   determining the error energy corresponding to the error terms averaged over the samples in the interval; and
   minimizing the error energy as a function of each of the weighting factors.

3. A method as claimed in claim 2 wherein the weighting factors of the recursion formula are selected to obey the relationship:

$$R_1 a = b_1$$

where $$R_1 = r_{i,k} = \frac{1}{N-p} \sum_{j=p}^{N-1} S_{j-k} S_{j-1}$$

in which $i, k = 1, \ldots, p$
$N$ = the number of samples in the interval
$p$ = the number of samples in the recursion formula
$S_{j-k}$ = the value of the $(j-k)^{th}$ sample in the interval
$r_{i,k}$ = the (i, k) estimated autocovariance coefficient
where $a = (a_1, \ldots, a_p)^T$ in which $a_1, \ldots a_p$ are the weighting factors of the recursion formula, and
where $b_1 = (-r_{1,0}, \ldots, -r_{p,0})^T$ and in which $$r_{i,o} = \frac{1}{N-p} \sum_{j=p}^{N-1} S_j S_{j-i}$$

with $i = 1, \ldots p$.

4. The method as claimed in claim 2, in which $R_2$ replaces $R_1$ and $b_2$ replaces $b_1$, and the weighting factors of the recursive formula are selected according to the relationship:

$$R_2 a = b_2$$

in which $R_1$ has been replaced by $R_2 = (r(i-k))_{i,k}$ where $i, k = 1, \ldots p$ and $p$ = number of samples in the recursive formula
in which $r(i-k)$ is an estimator for the $(i-k)^{th}$ autocorrelation coefficient, and
where the vector $b_1$ has been replaced by the vector $b_2 = -(r(1), r(2), \ldots, r(p))$
where $r(i)$ is an $i^{th}$ estimator for the autocorrelation coefficient.

5. A method as claimed in claim 4, wherein the estimators, $r(j)$, for the autocorrelation coefficients are determined by solving $$r(j) = \frac{1}{N} \sum_{k=0}^{N-j-1} S_k S_{k+j}$$

where
$j = (i-k) = 0, \ldots p$
$i, k = 0, \ldots p$.

6. A method as claimed in claims 4 or 5, characterized in that selecting the estimators for the autocorrelation coefficients sample values is done according to a coarser degree of quantization than that of the samples of the uniformly sampled signal.

7. A method as claimed in claim 6, wherein the estimators of the autocorrelation coefficients result from a multiplication of the values of two sample sets, $S_k, S_{k+1}$, addressing locations in a look up table containing precalculated results of the multiplications.

8. A method as claimed in claim 6, wherein a Toeplitz system expressed as $R_2 a = b_2$ is solved by using a Levinson-Durbin algorithm.

9. A method as claimed in claim 5, wherein the estimators of the autocorrelation coefficients result from a multiplication of the values of two sample sets, $S_k, S_{k+1}$, addressing locations in a look up table containing precalculated results of the multiplications.

10. A method as claimed in claim 9, wherein a Toeplitz system expressed as $R_2 a = b_2$ is solved by using a Levinson-Durbin algorithm.

11. A method as claimed in claim 5, wherein a Toeplitz system expressed as $R_2 a = b_2$ is solved by using a Levinson-Durbin algorithm.

12. A method as claimed in claim 1, wherein the step of determining the coefficients comprises selecting a predetermined ordering of coefficients of the recursion formula for a maximum number $p$ of samples in the recursion formula.

13. A method as claimed in claim 12, wherein said maximum number $p$ of values of the recursion formula is selected according to the number $m$ of samples having an erroneous value.

14. A method as claimed in claim 13, wherein the maximum number $p$ of samples increases as a linear function of the number of samples having erroneous values.

15. A method as claimed in claim 14, wherein the signal is an audio signal which is sampled using a frequency of approximately 44.1 kHz and the relationship between the maximum number $p$ of samples of the recursion and the number $m$ of erroneous sample values is controlled by $p \approx 3m + 2$.

16. A method as claimed in claim 14, wherein the sampled signal is an audio signal sampled at a rate whose frequency is about 44.1 kHz and the relationship between the number N of samples in the interval and the number of erroneous sample values m corresponds to $N \cong 32m$.

17. A method as claimed in claim 1, wherein the number N of samples in the sampling interval is determined by the number m of erroneous sample values.

18. A method as claimed in claim 17, wherein the number N of samples increases as a linear function of the number m of erroneous sample values.

19. A method as claimed in claim 1, wherein the estimated values of the samples having erroneous values are determined as:
within the interval in which the samples having erroneous values are situated, a second interval is determined whose first sample precedes a first sample having an erroneous value at least a number of samples equal to the number of samples in the recursion formula, and whose last sample follows the last sample having an erroneous value at least a number of samples equal to the number of samples in the recursion formula.
determining for at least the samples following the first sample having an erroneous value up to and including the last sample in the second interval, the recursion formula having the previously computed coefficients,
determining the error energy averaged over the relevant samples in the interval and corresponding to error terms of the recursion formulas, and
minimizing the error energy as a function of the values of the samples having erroneous values to determine said estimates of samples whereby correct values for said incorrect samples are determined.

20. A method as claimed in claim 19, wherein the recursion formula is selected to constitute the system of recursion equations of the form and solving mathematical steps indicated by $$Ax + By = e$$

where $$A = (a_{p+tj-i}) \quad i = 0, \ldots, N'-p-1$$
$$j = 1, \ldots, m$$

$x = (S_{t1}, \ldots S_{tm})^T$ where $S_{t1}, \ldots, S_{tm}$ are the values of the erroneous samples at positions $t_1, \ldots t_m$ in the second interval $$B = (a_{p+j-i}) \quad i = 0, \ldots, N'-p-1$$
$$j = 1, \ldots, N'-1; j \neq t_1, \ldots, t_m$$

and where $y = (S_k)^T k = 0, \ldots N'-1$; $k \neq t_1, \ldots, t_m$; $a_p$ = weighting factors of the recursive formula; $N'$ = numbers of samples in the second interval, $p$ = number of samples in the recursion formula, and $S_k$ = sample values in interval k.

21. A method as claimed in claim 20, characterized in that the vector $x_{min}$ is computed by solving the mathematical steps indicated in the system:

$$Vx_{min} = w$$

where $V = A^T A$ with $(A^T A)_{i,j} = \lambda_{ti-tj}$ in which $i, j = 1, \ldots, m$
where $w = (A^T B) y$ with $$(A^T By)_i = \sum_{k=0}^{N'-1} \lambda_{ti-k} S_k$$

in which $i = 1, \ldots, m$
$k \neq t_1, \ldots, t_m$
with $(A^T B)_{i,k} = \lambda_{ti-k}$ in which $$\begin{cases} i = 1, \ldots, m \\ k \neq t_1, \ldots t_m \end{cases}$$

and where $$\lambda_k = \sum_{l=0}^{p} a_l a_{l+k}$$

with $$\begin{cases} k = -p, \ldots, 0, \ldots p \\ a_l = 0, \text{ for } l > p \text{ and } l < 0. \end{cases}$$

22. A method as claimed in claim 21, characterized in that the erroneous samples are situated at consecutive instants $t_1, \ldots t_m$ and mathematical operations in the system $Vx_{min} = w$ are solved according to the Levinson algorithm.

23. The method according to claim 19 wherein the estimated values of the erroneous samples are determined by first determining for said second interval a first system of the recursion formula $$MS = e$$

where $$M = (m_{ij})[1]_{i=0, \ldots N'-p-1} = (a_{p-1+j})_{i=0, \ldots N'-p-1}$$
$$j = 0, \ldots N'-1 \quad\quad j = 0, \ldots N'-1$$

where N' is the number of samples in the second interval, $a_i = 0$, for $i < 0$ and $i > p$, and $a_0 = 1, a_1, \ldots, a_p$ = the weighting factors of the recursion formula
where $S = (S_0, \ldots, S_{N'-1})^T$ with $S_0, \ldots, S_{N'-1}$ being the values of the samples in the second interval, and
where $e = (e_p, e_{p+1}, \ldots, e_{N'-1})^T$ with $e_p, \ldots, e_{N'-1}$ being the values of the error terms of the recursion formulas for the samples $S_p, \ldots S_{N,-1}$
and then determining the value of a vector x defining the erroneous samples by converting the first system into a second system by performing mathematical operations according to $$Ax + By = e$$

where $$A = (a_{p+tj-i}) \quad i = 0, \ldots, N'-p-1$$
$$j = 1, \ldots, m$$

$x = (S_{t1}, \ldots S_{tm})^T$ where $S_{t1}, \ldots, S_{tm}$ are the values of the erroneous samples at positions $t_1, \ldots t_m$ in the second interval $$B = (a_{p+j-i}) \quad i = 0, \ldots, N' - p - 1$$
$$j = 1, \ldots, N' - 1; j \neq t_1, \ldots, t_m$$

and where $y = (S_k)^T k = 0, \ldots N' - 1; k \neq t_1, \ldots, t_m$.

24. An apparatus for correcting by interpolation erroneous values of signal samples of a uniformly sampled signal comprising:
   input means for receiving sample values of said sampled signal;
   detection means for identifying samples having erroneous values;
   computing means for selecting a sampling interval which includes said samples having erroneous values, and for determining from said interval containing said samples having erroneous values a best fitting recursion formula and, for estimating from said recursion formula the correct value for said erroneous values of samples by determining the value of a sample as a weighted sum of the values of a number of preceding samples and their respective coefficients, and an error term.

25. An apparatus as claimed in claim 24, wherein the computing means selected the sampling interval by determining:
   the number of erroneous samples, and
   computes the maximum number of said preceding samples in the weighted sum of the recursion formula.

26. An apparatus as claimed in claim 15, wherein the computing means further computes the weighting factors of the weighted sum of the recursion formula.

27. An apparatus as claimed in claim 26, wherein the means for computing the weighting factors computes the autocorrelation coefficients according to:

$$r(j) = \frac{1}{N} \sum_{k=o}^{N-j-1} S_k S_{k+j}$$

where $j = (i - k) = 0, \ldots p$
$i, k = 0, \ldots p$  $S_k$ = sample values in interval k, and $R = (r_{i,k})$ i, $k = 1, \ldots, p$ and p = number of, and solves a system defined as:

$$Ra = b$$

where
$r_{i,k} = r(j)$ with $j = (i-k) = 0, \ldots, p-1$; i, $k = 1, \ldots, p$
$b = -(r(1), r(2), \ldots, r(p))^T$
$a = (a_1, \ldots, a_p)^T$ where $a_i$ are the weighting factors.

28. An apparatus as claimed in claim 27, wherein the means for computing the autocorrelation coefficients also comprises means for reducing the degree of quantization of the values of the samples.

29. An apparatus as claimed in claim 27, wherein the samples have a degree of quantization and the means for computing the autocorrelation coefficients also comprises means for determining the product of the values of two samples by means of a table of possible values of said product.

30. An apparatus as claimed in claims 27, 28 or 29, wherein the system $Ra = b$ is solved by means for performing a Levinson-Durbin algorithm.

31. An apparatus as claimed in claim 30, wherein said computing means computes quantities according to:

$$\lambda_k = \sum_{l=0}^{p} a_l a_{l+k}$$

where $k = -p, \ldots, 0, \ldots p$ and $a_l = 0$ for $l > p$ and $l < 0$ and computes the numbers:

$$w_i = (A^T B y) = \sum_{k=0}^{N'-1} \lambda_{ti-k} S_k \quad (18)$$

where
$i = 1, \ldots m$
$k \neq t_1, \ldots t_m$.

32. An apparatus as claimed in claim 31, wherein the computing means further comprise means for solving the system:

$$V x_{min} = w$$

where $V = A^T A$ with $(A^T A)_{i,j} = \lambda_{ti-tj}$ in which i, j = 1, ..., m
$x_{min} = (S_{t1}, \ldots, S_{tm})^T$
where $S_{t1}, \ldots S_{tm}$ are the values of the missing samples.

33. An apparatus as claimed in claim 32, where $S_{t1}, \ldots S_{tm}$ are consecutive samples, and the apparatus further comprises means for solving the system $Vx_{min} = w$ through a Levinson algorithm.

* * * * *